United States Patent
Ludmann

(10) Patent No.: US 7,627,832 B2
(45) Date of Patent: Dec. 1, 2009

(54) DYNAMICALLY PLACING RESOURCES WITHIN A GRAPHICAL USER INTERFACE

(75) Inventor: Sandor Ludmann, Winchester, MA (US)

(73) Assignee: The Escher Group, Ltd., Cambridge, MA (US)

( * ) Notice: Subject to any disclaimer, the term of this patent is extended or adjusted under 35 U.S.C. 154(b) by 543 days.

(21) Appl. No.: 11/359,839

(22) Filed: Feb. 22, 2006

(65) Prior Publication Data

US 2007/0198922 A1 Aug. 23, 2007

(51) Int. Cl.
*G06F 3/00* (2006.01)
(52) U.S. Cl. .................... 715/781; 715/788; 715/806
(58) Field of Classification Search ............... 715/788, 715/781, 806
See application file for complete search history.

(56) References Cited

U.S. PATENT DOCUMENTS

| | | | |
|---|---|---|---|
| 5,179,649 A * | 1/1993 | Masuzaki et al. ........... 715/224 |
| 5,864,343 A | 1/1999 | Naughton et al. |
| 6,188,404 B1 | 2/2001 | Rekimoto |
| 6,246,403 B1 | 6/2001 | Tomm |
| 6,344,863 B1 | 2/2002 | Capelli et al. |
| 6,441,833 B1 | 8/2002 | Anderson et al. |
| 6,501,469 B1 | 12/2002 | MacPhail |
| 6,912,462 B2 * | 6/2005 | Ogaki ........................ 701/208 |
| 2002/0154165 A1 | 10/2002 | Yu |
| 2003/0074634 A1 | 4/2003 | Emmelmann |
| 2003/0210268 A1 | 11/2003 | Kataoka et al. |
| 2004/0215659 A1 * | 10/2004 | Singfield et al. ......... 707/104.1 |
| 2006/0259516 A1 * | 11/2006 | Stakutis et al. .............. 707/200 |

* cited by examiner

*Primary Examiner*—Dennis Bonshock
(74) *Attorney, Agent, or Firm*—Cesari and McKenna, LLP

(57) ABSTRACT

A technique dynamically places resources within a graphical user interface (GUI). According to the novel technique, a resource (e.g., an image of the resource) of the GUI is assigned a filename (e.g., by a graphic designer) having position information encoded therein. For example, a resource with coordinates of 50 pixels in the "X" direction ("50X") and 50 pixels in the "Y" direction ("50Y") may be represented with a corresponding filename: "resourcename_50×50.jpg." Software code that displays the GUI (e.g., maintained by a software developer) may then dynamically interpret the filename to parse out the position information (e.g., 50X and 50Y). The software code then places the resource in a position within the GUI according to the position information. Subsequently, changing the position information encoded within the filename (e.g., by the graphic designer) changes the position of the resource in the GUI (e.g., renaming the resource to "resourcename_100×50.jpg" replaces the resource at 100X and 50Y).

18 Claims, 10 Drawing Sheets

DYNAMICALLY PLACING RESOURCES WITHIN A GRAPHICAL USER INTERFACE

BACKGROUND OF THE INVENTION

1. Field of the Invention

This invention relates generally to computer programming, and more particularly, to dynamically placing resources within a graphical user interface (GUI).

2. Background Information

Generally, computers have had many different uses and/or purposes, such as for performing calculations, word processing, data storage, etc. Computers normally have a means for processing data, a means for displaying data, and means for inputting data. An example computer may take the form of a personal computer (PC) or other device, such as a peripheral device (e.g., handheld devices, etc.). Until recently, people have interfaced with computers primarily utilizing text-based interfaces, or Command Line Interfaces (CLIs). In a CLI, a user inputs text-based commands to the computer based on one or more programming languages (e.g., a disk operating system, or DOS language, etc.) using a keyboard. The computer then responds according to the inputs and returns a computed result on the display.

Because of the many different commands available to a user, and the often difficult learning curve associated with CLIs, today's computers often utilize what is known as a Graphical User Interface (GUI). A GUI is an operating system interface based on graphics, rather than (or in addition to) text. Typically, a mouse or other tracking device is used to select between any number of objects or icons (e.g., buttons, scroll bars, images, entry fields, etc.), or "resources," shown on the display. Each of the resources represents a different command to the computer, which responds according to the user's resource selection. For instance, instead of typing a command to operate an executable program, e.g., typing "run program.exe" into a command line, a user of a GUI may simply point to the icon representing the program, and select the icon (e.g., by "clicking" the mouse). The computer then responds accordingly (i.e., operating the program). A common example of a GUI for use with PCs is the Microsoft® Windows® operating system.

Also, as those skilled in the art will understand, one or more GUIs for specific applications/programs may be displayed within other GUIs (e.g., a program running in Windows® may also be a GUI). Further, in addition to being used for PCs, GUIs may also be used for specifically designed devices. For example, handheld devices used for various task-related purposes may have specifically-integrated GUIs designed for performing that task (e.g., tracking packages, etc.).

The creation of a GUI begins with development of the GUI's software or code, typically by one or more software developers. The software developers, using a selected GUI programming language, design the overall layout and functionality of the GUI based on techniques understood by those skilled in the art. For instance, the software developers create and/or use a variety of resources (images, buttons, icons, etc.), and associate each of the resources with a plurality of properties. Those properties generally comprise, e.g., a command/control/action to perform in response to selection of the resource, a location or position of the resource, a size of the resource, a font for any text of the resource, etc. Each resource is also given a name (e.g., "resource1.jpg"), and may be stored in a memory, such as a non-volatile memory or "file store," for use with the GUI (.jpg is a JPEG image file extension, as will be understood by those skilled in the art). Also, the resource may be stored in a database or within the executable as an embedded resource, as will be understood. A programming language many software developers currently use to create GUIs is Visual Basic® (VB) available from Microsoft®.

To assist with the layout and appearance of the GUI, software developers often enlist the services of graphic designers to graphically design visuals for the resources (e.g., create images for the icons, buttons, etc.), and to determine an appropriate position for the resource within the GUI. For instance, based on the desired functionality, a graphic designer may be asked to create the overall layout of a GUI, such as a background, images to be used for each resource, placement of the resources, etc., thus creating a graphical image of the GUI.

Once the overall GUI image is created, the graphic designer may "cut" the image for each resource from the overall image, and save the respective cut images with agreed filenames for the corresponding resources. For example, the image of a "help" icon within the GUI may be cut and saved as "help.jpg." The graphic designers may then provide the software developer with the saved image for the particular resource (e.g., by saving it in the file store), and further provide the software developer with the position information regarding the resource. For instance, if the "help" resource was located at coordinates of 50 pixels in the "X" direction ("50X"), and 50 pixels in the "Y" direction ("50Y"), the graphic designer informs the software developer of this location (e.g., "50×50"). The software developer may then enter the position information of the resource (e.g., "help.jpg") into the GUI code, along with other necessary parameters (properties) of the resource, such as what action should be taken as a result of the selection of is the resource (e.g., enter a "help menu"). Notably, an example program that may be used by graphic designers to create and cut the image is Adobe Photoshop®. The end result is a GUI that may be generated by executing the GUI generating code (e.g., the "executable"), which reads the data for the resources (e.g., the images) from the file store, places the resource images according to the code, and associates resource parameters accordingly.

One problem with the above arrangement between the software developer and the graphic designer is that the graphic designers often change the layout of the GUI during development (and afterward), e.g., to move resources from one location to another (and/or to change the image associated with the resource). For example, assuming the "help.jpg" resource was originally located at 50×50 as mentioned above, the graphic designer may wish to change the location to 100×50 (i.e., moving the resource 50 pixels in the "X" direction). As a result, the graphic designer informs the software developer of the position information change for the resource, and the software developer re-enters the code to change the appropriate parameters (i.e., the position). If the graphic designer again changes the position, once more, the software developer must re-enter the code to adjust the parameters accordingly. This "back-and-forth" between the graphic designer and software developer wastes valuable time and resources for those involved.

FIG. 1 is a flowchart illustrating an example of an inefficient procedure for developing a GUI described above. The procedure 100 starts at step 105, and continues to step 110, where a software developer develops code for the GUI, as will be understood by those skilled in the art. At step 115, a graphic designer graphically designs a resource, e.g., an image (e.g., "help.jpg"), for the GUI, and at step 120, determines the position of the resource within the GUI (e.g., 50×50). The graphic designer then saves the resource in the file store for insertion into the GUI at step 125 (e.g., for when the GUI is generated), and informs the software developer of the resource's position in step 130. The software developer then programs the code of the GUI to place the resource in the corresponding position in step 135. GUI creation software (a "GUI executable") may graphically display (create) the GUI accordingly in step 140, and if there are no changes to the resource's position in step 145, the procedure ends at step 150. In the event, however, the is graphic designer should decide to change the position of the resource (e.g., during the development of the GUI) in step 145, the designer must inform the software developer of the new position (e.g., 100× 50) in step 130. The software developer must then reprogram the GUI to place the resource in the new position in step 135.

As mentioned, the graphic designer may often change the position of a resource during development of the GUI, and the back-and-forth between the designer and the software developer of steps 130 through 145 becomes a major inefficiency in the development process. There remains a need, therefore, for a technique that allows software developers and graphic designers to more efficiently collaborate on the placement of resources during the development of a GUI. In particular, there remains a need to substantially eliminate the back-and-forth involved with changing the position of the resources.

SUMMARY OF THE INVENTION

The present invention is directed to a technique for dynamically placing resources within a graphical user interface (GUI). According to the novel technique, a resource (e.g., an image of the resource) of the GUI is assigned a filename (e.g., by a graphic designer) having position information encoded therein. For example, a resource with coordinates of 50 pixels in the "X" direction ("50X") and 50 pixels in the "Y" direction ("50Y") may be represented with a corresponding filename: "resourcename_50×50.jpg." Software code that displays the GUI (e.g., maintained by a software developer) may then dynamically interpret the filename to parse out the position information (e.g., 50X and 50Y). The software code then places the resource in a position within the GUI according to the position information. Subsequently, changing the position information encoded within the filename (e.g., by the graphic designer) changes the position of the resource on the GUI (e.g., renaming the resource to "resourcename_100×50.jpg" replaces the resource at 100X and 50Y).

Advantageously, the novel technique dynamically places resources within a GUI. By encoding the position information within the filename of the resource, the novel technique reduces the steps involved between graphic designers and software developers for laying out the resources within the GUI. Accordingly, valuable preparation time in generating the GUI is saved for both the graphic designers and software developers. Allowing the graphical designers (or anyone) to dynamically change the position of a resource within the GUI simply by changing the resource's filename thus eliminates the graphical designers' dependency upon the software developers' re-coding the placement of the resources.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 2:
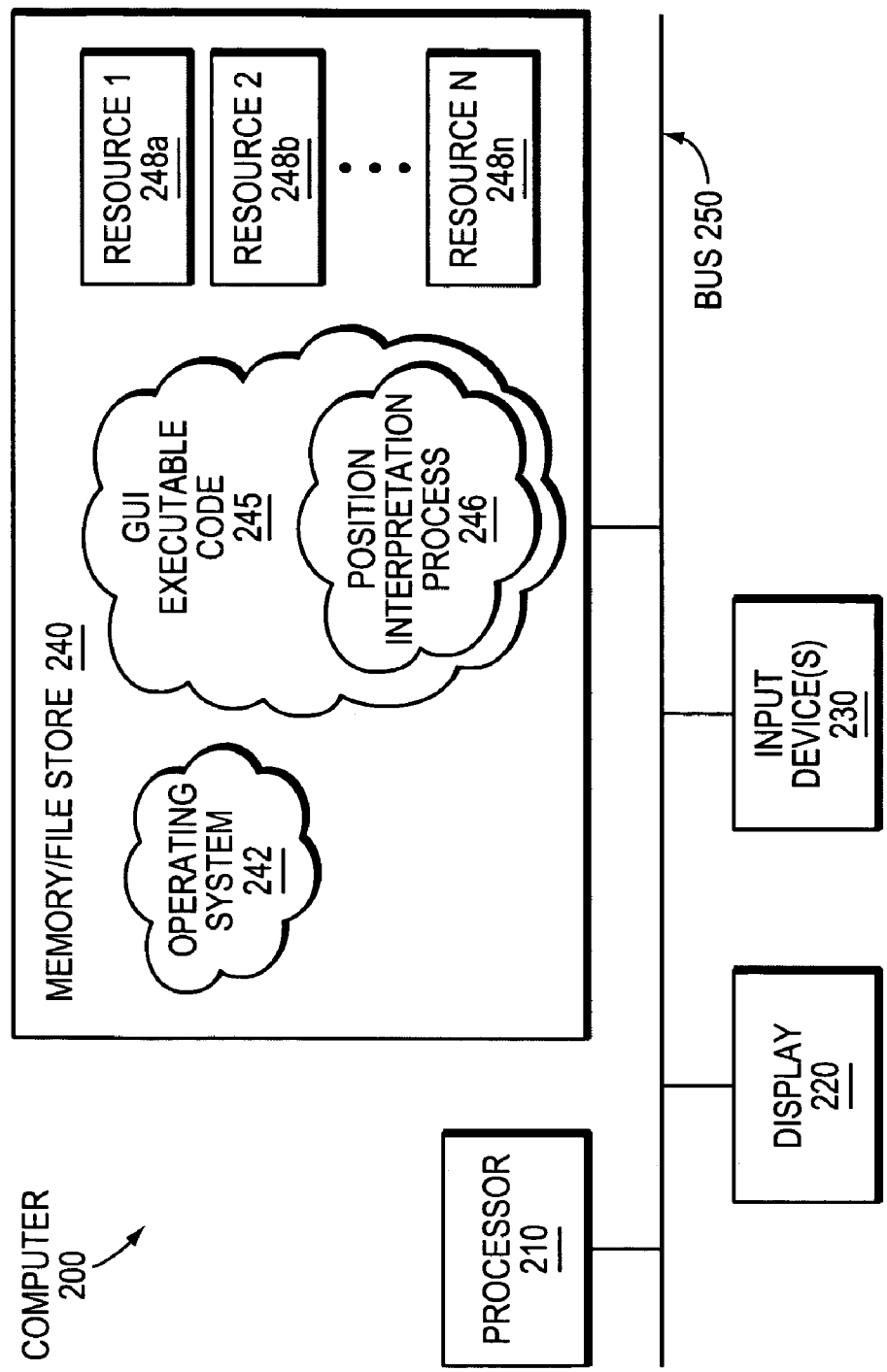
FIG. 2 is a schematic block diagram of an exemplary computer that may be advantageously used with the present invention.

FIG. 2 is a schematic block diagram of an exemplary computer 200 that may be advantageously used with the present invention, such as a personal computer (PC), personal digital assistant (PDA), other handheld devices, etc. The computer comprises a processor 210, a display 220, one or more input devices 230, and a memory 240 (e.g., a file store) interconnected by a system bus 250. The display 220 may be used to display images or graphics associated with a Graphical User Interface (GUI) in accordance with the present invention. Input devices 230 allow a user to interact with the computer 200, and may comprise, inter alia, a keyboard, a mouse, a touch screen (e.g., with a stylus), which may be embodied as display 220, etc. Input devices 230 may also comprise communication ports (e.g., serial/parallel ports, a universal serial bus, USB, etc.) configured to receive data from external sources, such as, e.g., pre-programmed GUIs that have been developed on one or more other computers 200. Those skilled in the art will understand that the computer 200 as shown herein is merely representative, and may comprise other components (not shown), e.g., output devices, networking interfaces, etc. The view shown herein is for ease of understanding.

The memory 240 comprises a plurality of storage locations that are addressable by the processor 210 for storing software programs and data structures associated with the present invention. The processor 210 may comprise necessary elements or logic adapted to execute the software programs and manipulate the data structures, such as resources 248*a-n* (e.g., "resource1" through "resourceN"). An operating system 242 (e.g., Microsoft® Windows® or other proprietary operating system), portions of which are typically resident in memory 240 and executed by the processor, functionally organizes the computer by, inter alia, invoking operations in support of software processes and/or services executing on the computer. These software processes and/or services may comprise GUI executable code 245 (e.g., a GUI generation process and/or GUI creation software) and a position interpretation process 246. It will be apparent to those skilled in the art that other processor and memory means, including various computer-readable media, may be used to store and execute program instructions pertaining to the inventive technique described herein.

GUI executable code 245 contains computer executable instructions executed by processor 210 to generate and maintain (execute) the GUI in accordance with the present invention. Various functions and/or processes may be contained within the computer executable instructions, e.g., as programmed by one or more software developers. These functions may be configured to, for example, display images, prompt a user for a response, detect resource selection, respond to resource selection, compute results, etc., as will be understood by those skilled in the art. In particular, in accordance with the present invention, one such function may be a novel position interpretation process 246, described below.

Figure 3A:
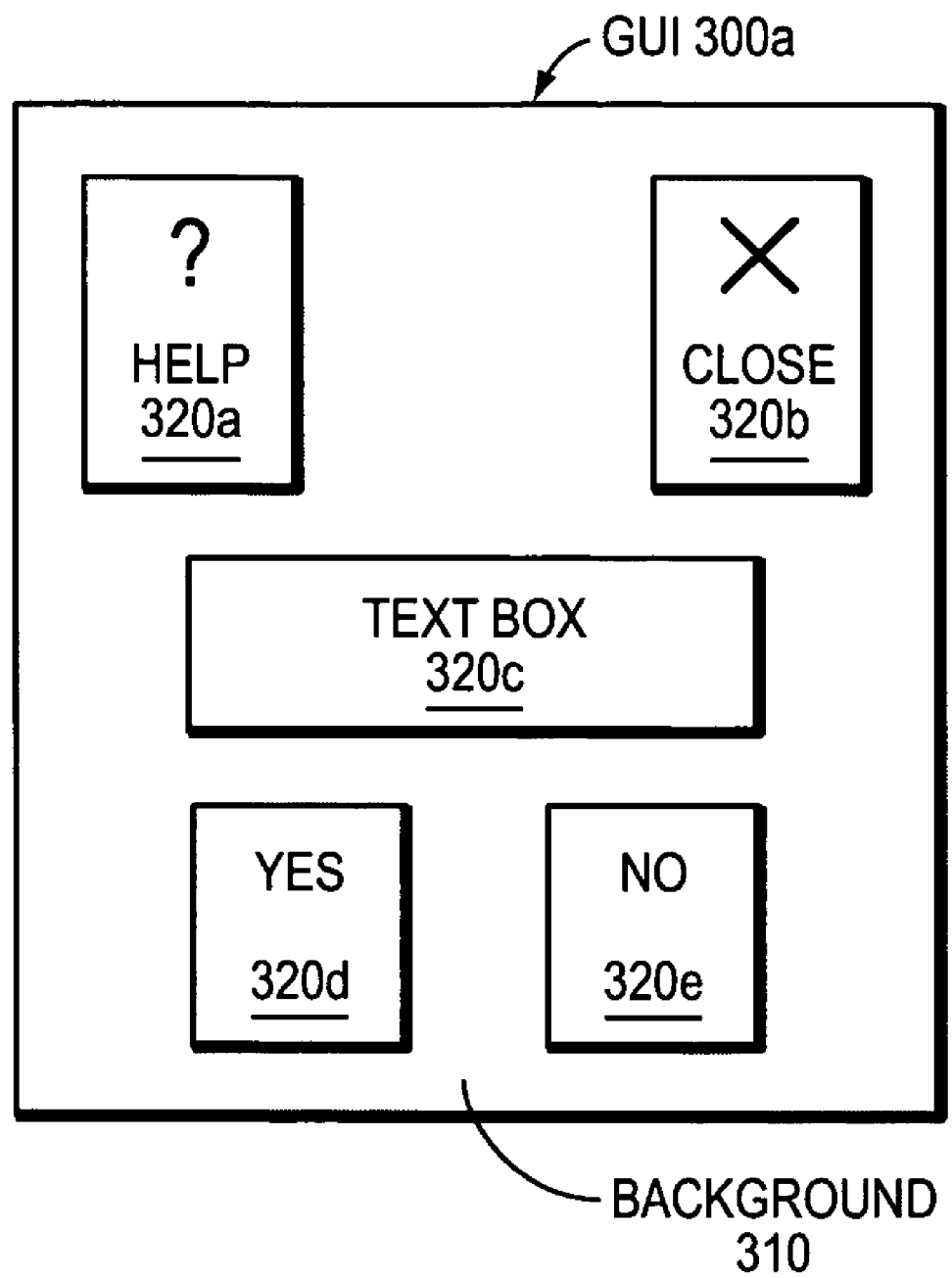
FIG. 3A is a schematic block diagram of an exemplary GUI that may be used in accordance with the present invention.

FIG. 3A is a schematic block diagram of an exemplary GUI 300a that may be used in accordance with the present invention. The GUI 300a generally comprises a background 310 having one or more resources 320 (e.g., 320a-320e) placed thereon. Each of the resources 320 corresponds to a particular function (e.g., a control or command), and is illustratively placed within the GUI as shown. For instance, exemplary resources may comprise a "Help ?" resource 320a, a "Close X" resource 320b, a "Text Box" resource 320c, a "Yes" resource 320d, and a "No" resource 320e. Notably, each resource 320 may be graphically associated with a particular image (e.g., "?," "X," etc.) in accordance with GUI functionality. Those skilled in the art will understand that the resources 320 shown (i.e., 320a-e) are merely examples, and that any resources may be used in any arrangement within a GUI 300a in accordance with the present invention. For example, text prompts, check boxes, radio buttons, etc., may be used as resources according to the present invention. Illustratively, the GUI 300a may be the result of operating GUI executable code 245, and may be presented on the display 220 of the computer 200.

The present invention is directed to a technique for dynamically placing resources within a GUI. According to the novel technique, a resource (e.g., an image of the resource) of the GUI is assigned a filename (e.g., by a graphic designer) having position information encoded therein. For example, the filename may be formatted according to a predefined arrangement, such as, e.g., "{resource name}_{position information}.{extension}." The resource name may be a unique name referencing a particular resource of the GUI, and the extension is a file type extension of the resource (e.g., .jpg, .bmp, etc.), as will be understood by those skilled in the art. Notably, the graphic designer and software developer may have been agreed upon this resource name and extension prior to developing the code or creating the design, e.g., in order to ensure that both the designer and developer reference the same resource. For instance, the Help resource 320a may be referenced as "help.jpg."

In accordance with one aspect of the present invention, the position information represents an encoded location of the resource within the GUI. For example, assume that GUI 300a in FIG. 3 is an image of a GUI as designed by a graphic designer. A resource of the GUI 300, e.g., the Help resource 320a, may have coordinates of 50 pixels in the "X" direction ("50X") and 50 pixels in the "Y" direction ("50Y"), which may be represented with a corresponding position information "50×50." The graphic designer may therefore save the image for the Help resource 320a as a filename (e.g., in the file store 240) represented as "help_50×50.jpg" (i.e., the agreed upon resource name and extension "help.jpg," with the inserted position information "50×50"). Notably, the position information may include a string of characters that signifies to the GUI executable a beginning of the position information within the filename, e.g., "_pi_50×50" as described below.

Those skilled in the art will understand that references to positions and coordinates herein are general representations of positions within the GUI 300. For example, two-dimensional (2D) coordinates (e.g., Cartesian coordinates or polar coordinates) of the resource within the GUI may be represented with the position information. Notably, a three-dimensional (3D) GUI may utilize 3D coordinates in a similar manner (e.g., with an additional coordinate, such as "50×50× 50"). Also, as those skilled in the art will understand, the position information of the resource may reference a particular point of the resource, such as, e.g., a geometric center of the resource, a top left corner of the resource, a top right corner of the resource, a bottom left corner of the resource, a bottom right corner of the resource, etc. Further, the coordinate measurement (e.g., pixels, inches, millimeters, etc.) may originate from any predetermined position within the GUI 300, such as a geometric center of the GUI, a top left corner of the GUI, a top right corner of the GUI, a bottom left corner of the GUI, a bottom right corner of the GUI, etc. Those skilled in the art will also understand that the GUIs as shown herein (e.g., GUI 300) are not drawn to scale, and are merely representative.

Software code that displays the GUI (e.g., maintained by a software developer), such as GUI executable 245, may then dynamically interpret the filename to parse out the position information (e.g., 50X and 50Y). For instance, the GUI executable may load each resource independently (e.g., in alphabetical order or other manner), such as by performing pattern matching for particular resource name (or "prefix") and extension. For example, the executable may search for the resource name and extension for the Help resource 320a, "help.jpg," within the file store 240 using a "help*.jpg" string, i.e., where the "*" is a wildcard representing any value between "help" and ".jpg" as will be understood by those skilled in the art. Notably, as opposed to looking for predefined resource names (prefixes), the position interpretation process may instead look for patterns indicating particular resources followed by any resource name, e.g., "buttons_" before any buttons within the GUI (e.g., "button_yes_50× 50.jpg" for a button called "yes"), as those skilled in the art will understand. Notably, any search method supported by the underlying file (or resource) store may be utilized in accordance with the present invention. (For example, as those skilled in the art will understand, if the file store supported a regular expression search method, then the regular expression, e.g., {resource name}+"(\ . . . {1,}|_[0-9]{1,3}×[0-9]{1,3}\ . . . {1,})" may be used to find files matching {resource name}_{position information}.{extension}.) Other search methods may be used to search for the resource, and those mentioned herein are merely representative examples.

When the resource is located, the resultant filename is processed to determine whether any position information exists (e.g., by position interpretation process 246). Various pattern matching techniques may determine the existence of position information, e.g., parsing out the "_XXX×YYY" information between the resource name and extension (e.g., "_50×50"), and returning the appropriate location values based on the numbers represented by the "XXX" or "YYY." As mentioned above, the position interpretation process may alternatively search for a position information prefix, e.g., "_pi_XXX×YYY," to determine the location of the position information within the filename. In the event a position information field is found, the corresponding position information is returned to the GUI executable. Otherwise, if the resource does not have any position information within the filename, a default position of the resource may be used, i.e., where a default position has been originally created/established by the software developer within the code.

The software code may then place the resource (e.g., Help resource 320a) in a position within the GUI 300a according to the returned position information (e.g., at 50X and 50Y), and associate appropriate properties with the resource, e.g., predefined controls/commands/etc. (e.g., entering a "help menu"). Illustratively, the GUI executable may be created in accordance with Visual Basic® (VB) forms and controls, although those skilled in the art will understand that the techniques associated with the present invention are software language independent.

Figure 3B:
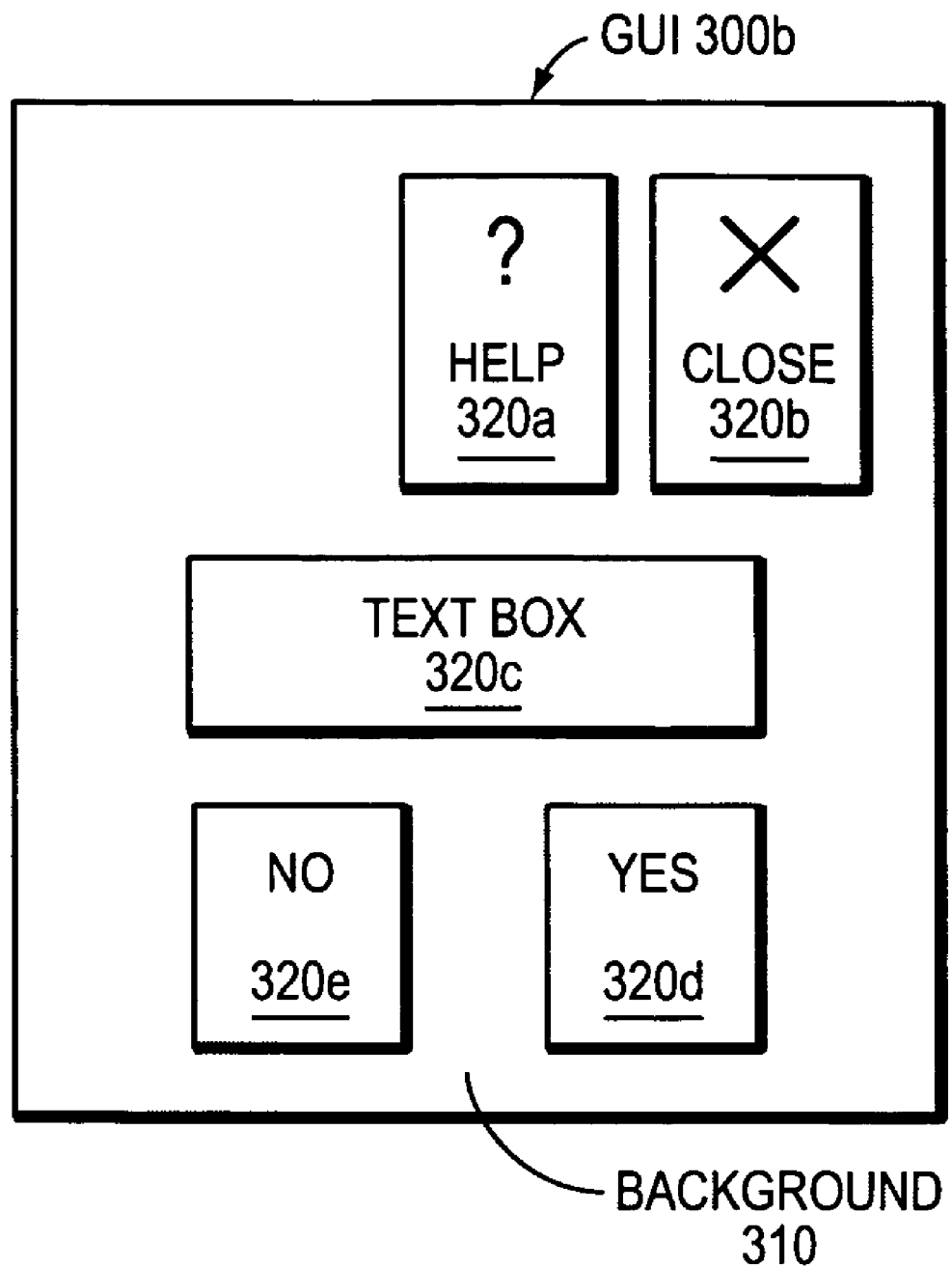
FIG. 3B is a schematic block diagram of the GUI in FIG. 3A with resources in changed positions in accordance with the present invention.

Subsequently, changing the position information encoded within the filename (e.g., by the graphic designer) may change the position of the resource. For example, if the graphic designer decides to relocate the Help resource 320a of the GUI 300, the graphic designer may rename the resource to "help_100×50.jpg," accordingly. In this manner, once the GUI executable is run in accordance with the software developer's code described above, the resource may be replaced at 100X and 50Y. FIG. 3B is a schematic block diagram of the GUI in FIG. 3A with resources in changed positions in accordance with the present invention. As shown, Help resource 320a has been repositioned within the GUI 300b according to the new filename (e.g., "help_100×50.jpg"). As a further example, assume that Yes resource 320d originally had a filename "Yes_75×200.jpg" and No resource 320e originally had a filename "No_100×200.jpg." By exchanging the "X" coordinates, positions of the Yes resource 320d ("Yes_100× 200") and No resource 320e ("No_75×200") may be swapped accordingly.

Notably, in addition to being placed relative to positions within the GUI, resources may also be placed relative to position of other resources. For example, a graphic designer may wish to assign a position of a first resource, and simply maintain a second resource at a certain location in relation to the first resource. For instance, resources (e.g., buttons, text boxes, etc.) of the GUI may comprise a "background," such as a similar border, design, color, etc. (e.g., the box around the Help resource 320a). Accordingly, a first resource may consist of simply the resource's background (e.g., the "box" layout of "Button1"), which is to be placed at a certain position within the GUI. To "fill" the background, then, a second resource (e.g., "Help") may be placed within the first resource (e.g., Button1), i.e., in a position relative to that of the first resource, thus providing content for the first resource (e.g., an "icon"). Because the location of the second resource is relative to the location of the first resource, the second resource will "follow" the first resource without changing its relative position. Notably, the relative location of the second resources within the first resources may be placed according to the present invention, such as, e.g., "Help_5×5" to place the content resource at a position of 5X and 5Y within the first resource (Button1).

Figure 4A:
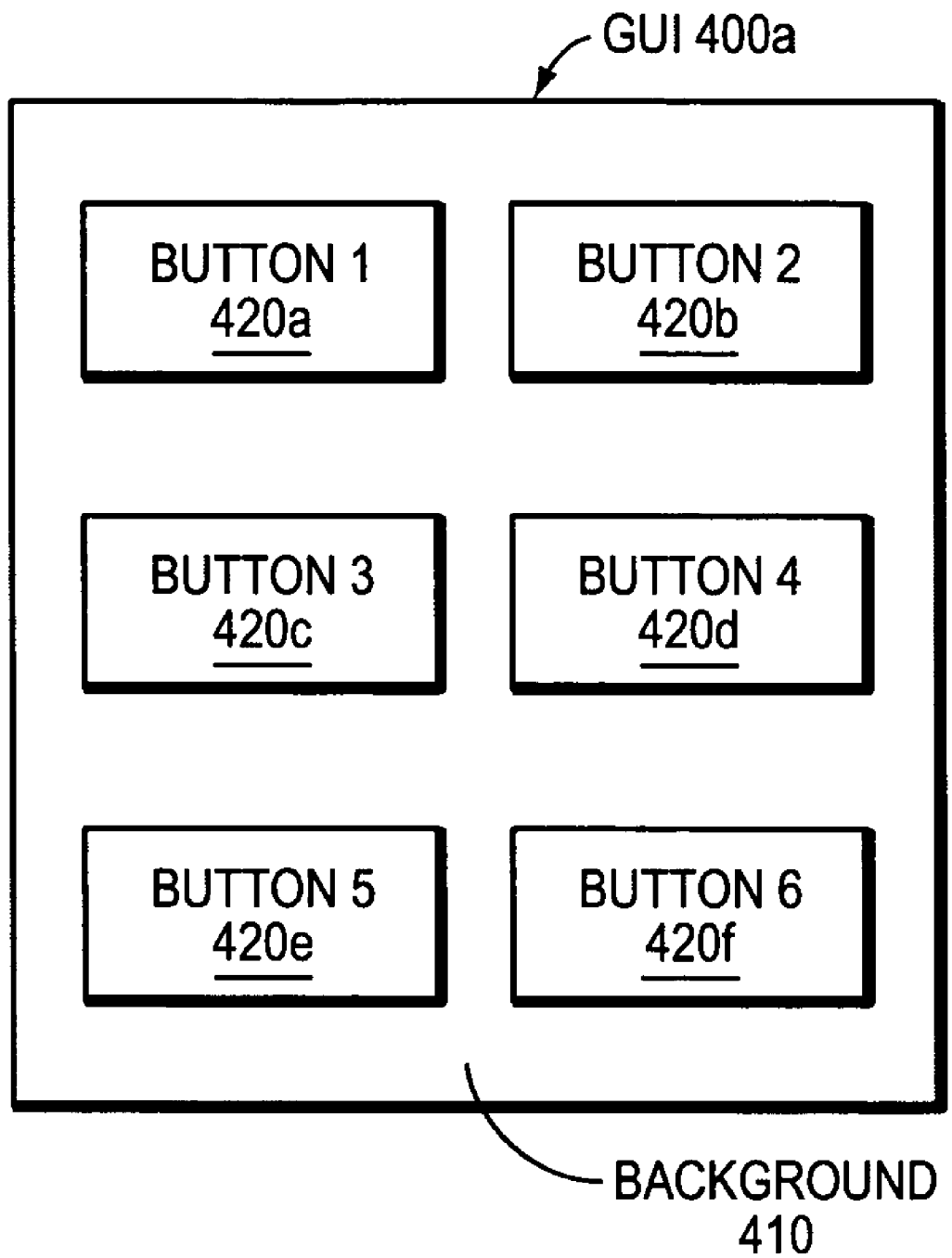
FIG. 4A is a schematic block diagram of an exemplary GUI with a series of resources that may be used in accordance with the present invention.

In accordance with another aspect of the present invention, the position information encoded within the filename of the resource may also be used to represent a position of the resource within the GUI relative to a series of resources of the GUI. For instance, FIG. 4A is a schematic block diagram of an exemplary GUI 400a with a series of resources that may be used in accordance with the present invention. A series may generally be defined herein as a collection of resources whose respective locations are dependent upon positions of the other resources of the series. Assume the layout of GUI 400a having button resources 420 "Button 1" through "Button 6" as shown. In this example, two columns of button resources exist, where each column comprises three rows. Illustratively, Button 1 is located in the first column ("C1"), and the first row ("R1"), Button 2 is located at C2 and R1, etc.

According to the present invention, then, the encoded position information may alternatively represent positions of the resources in relation to other resources within a series. For example, assume that the button resources Button 1 through Button 6 have been associated together as a series within the GUI executable code 245, e.g., by the software developer. The graphic designer may then be tasked with the specific placement of each of the button resources. In a similar manner to that described above, the graphic designer may correspondingly name each button of GUI 400a in row and column form as, e.g., "Button1_C1×R1.bmp," "Button2_C2×R1.bmp," Button3_C2×R1.bmp," etc. Notably, the spacing between the resources of a series may be a default value, e.g., no spacing or a certain measurement (e.g., 10 pixels). Alternatively, the spacing may also be represented by the encoded position information within the filename, e.g., "_C1×R1×10" for 10 pixels of spacing in each direction. Those skilled in the art will understand that more complex spacing schemes may be represented by the position information, as well as more complex series (e.g., 3D series), and that the series shown and described herein is merely representative.

Figure 4B:
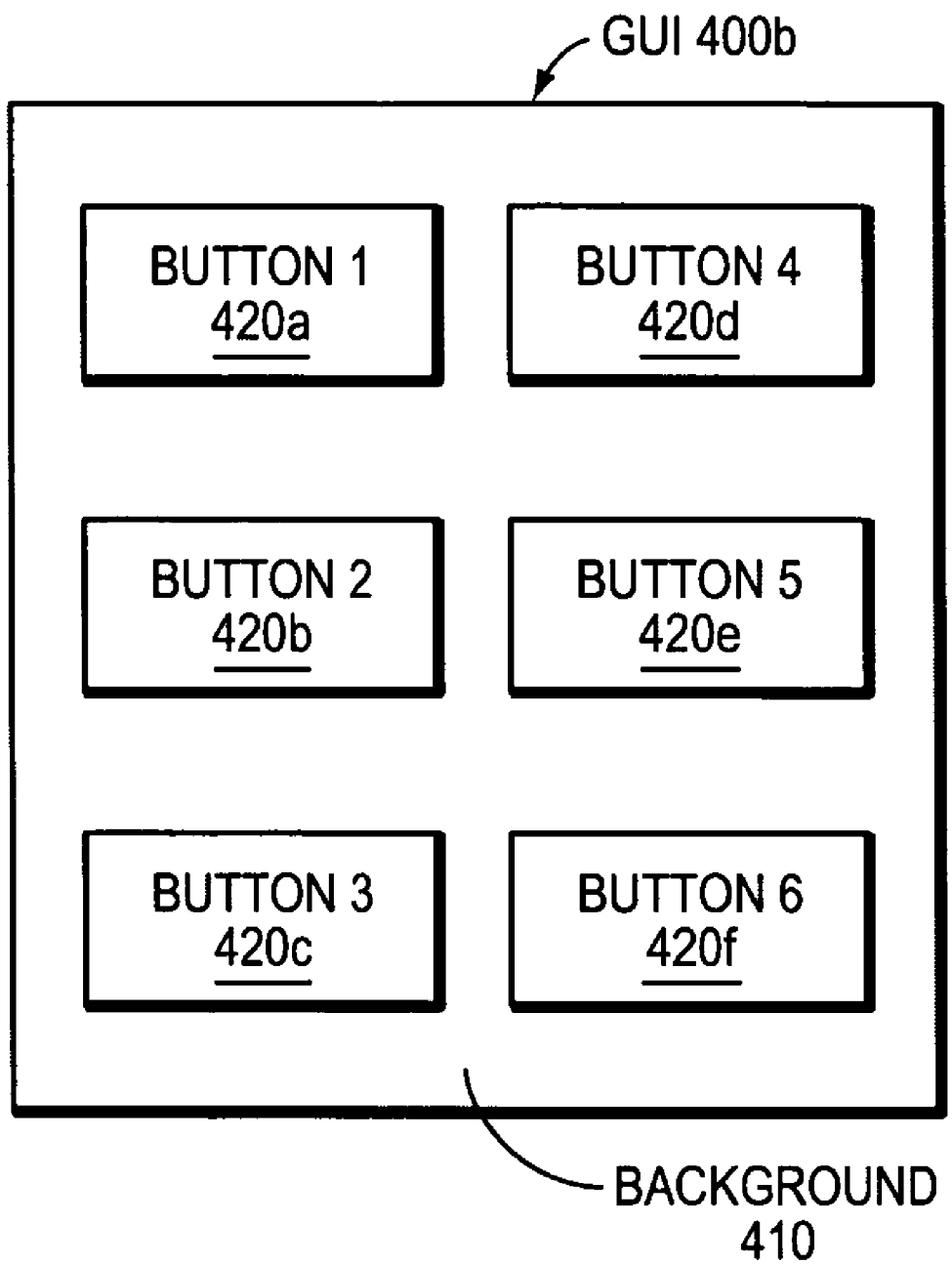
FIG. 4B is a schematic block diagram of the GUI in FIG. 4A with resources in changed series positions in accordance with the present invention.

As described above, the GUI executable code 245 interprets the encoded position information within the filename, and places the resources accordingly. Should the graphic designer decide to change the location of the resources within the series, the filenames may be correspondingly changed. FIG. 4B is a schematic block diagram of the GUI in FIG. 4A with resources in changed series positions in accordance with the present invention. Here, for example, the graphic designer may rename the button resources 420 as, e.g., "Button1_C1× R1.bmp," "Button2_C1×R2.bmp," Button3_C1×R3.bmp," "Button4_C2×R1.bmp," etc.

Notably, alternative filenaming schemes may be used in accordance with the present invention to signify resources within a series. For instance, a single filename may be used to create a series of resources. For example, assume that in the above example, each of the six buttons utilize the same overall button appearance (e.g., a button "background," such as a border, color, etc.). An illustrative filename may be embodied as "{resource name}_{position information}_{series information}_{spacing information}.{extension}." Assuming the six buttons above, then, a filename that may be used to create the series may be "Button_50×50_1of2×3_sp10× 20.jpg" may be used to create two columns of three rows ("1of2×3") starting with a first button located at 50X an 50Y ("50×50"), with each button spaced 10 pixels apart horizontally and 20 pixels apart vertically ("sp10×20"). Notably, content resources (e.g., icons) for the buttons may or may not be associated with the resources of the series.

Figure 4C:
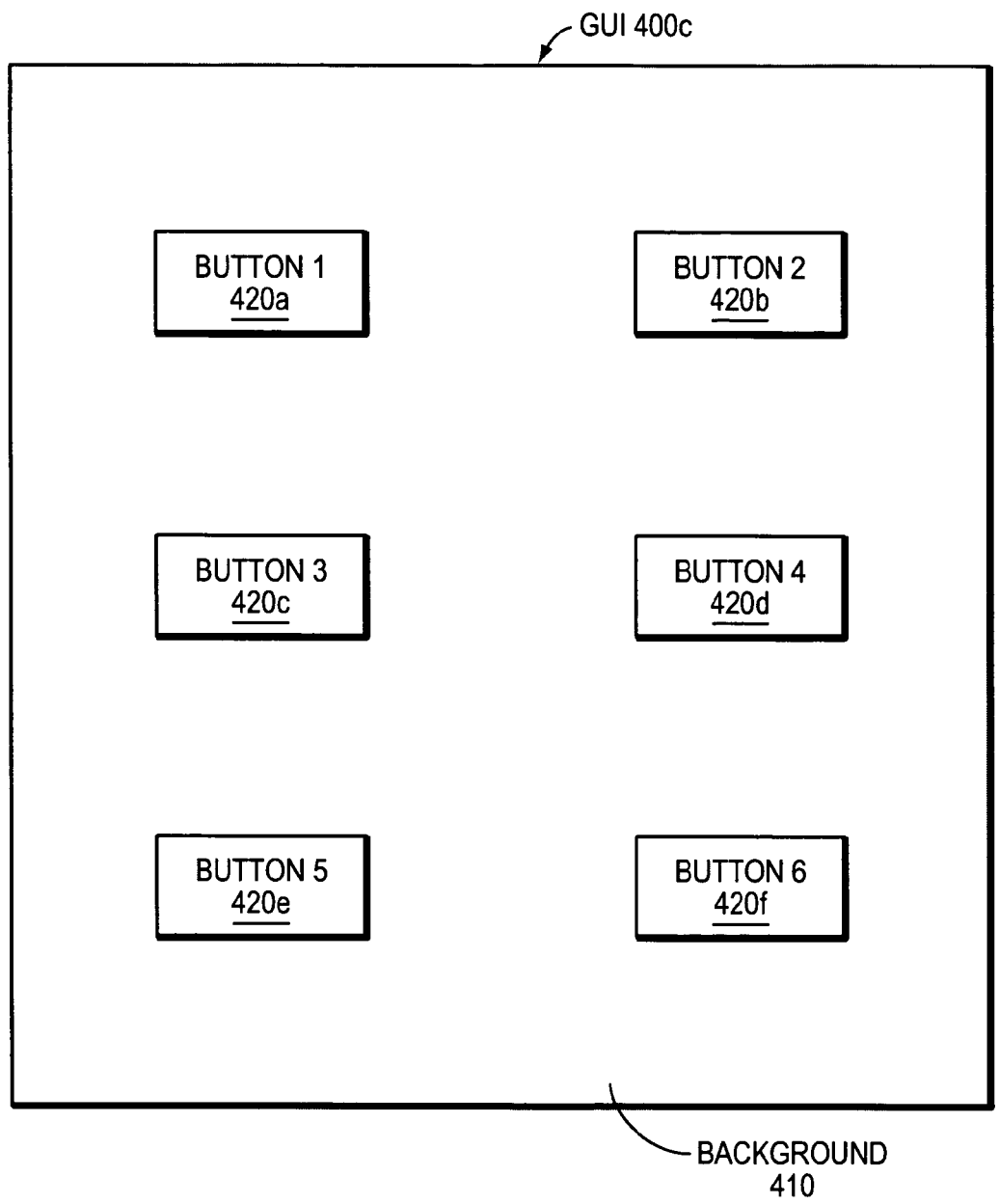
FIG. 4C is a schematic block diagram of the GUI in FIG. 4A with resources positions adjusted according to screen size and resolution in accordance with the present invention.

In addition to defining the location of the resources within a series, the present invention may also advantageously be used to account for varying screen sizes and resolutions, as will be understood by those skilled in the art. For instance, by adjusting the spacing between the resources of the series based on a screen size and resolution of the GUI, e.g., using a spacing multiplier or default spacing based on screen size and resolution, the series of resources may remain substantially proportionally spaced within the GUI. FIG. 4C is a schematic block diagram of the GUI in FIG. 4A with resources positions adjusted according to screen size and resolution in accordance with the present invention. For instance, assume that a resolution of the GUI 400a of FIG. 4A is 100×100, as will be understood by those skilled in the art. If the resolution is changed, e.g., to 200×200 (i.e., double the resolution), then the spacing between the resources may be doubled as well. If the screen size has also increased in size, e.g., GUI 400*c* in FIG. 4C, then the appearance of the spacing between the resources will have increased as well.

Notably, accounting for varying screen sizes and resolutions may also be used with resources not within a series (e.g., of FIGS. 3A and 3B above), where the measurements may be adjusted accordingly (e.g., in this example, by doubling the measurements encoded within the position information). Alternatively, multiple resolutions/screen sizes may be supported by having multiple sets of the resources stored in a location that is derived from particular resolutions. For example a GUI may support resolutions 240×320 and 480× 640 by having two sets of resources. One set of resources may be stored in a folder called, e.g., "Resources_240×320," and the other "Resources 480×640," respectively. The GUI (e.g., the executable) could then, during execution, determine the current resolution and search for the resources in the corresponding folder to use in the GUI, as, will be understood by those skilled in the art.

Figure 5:
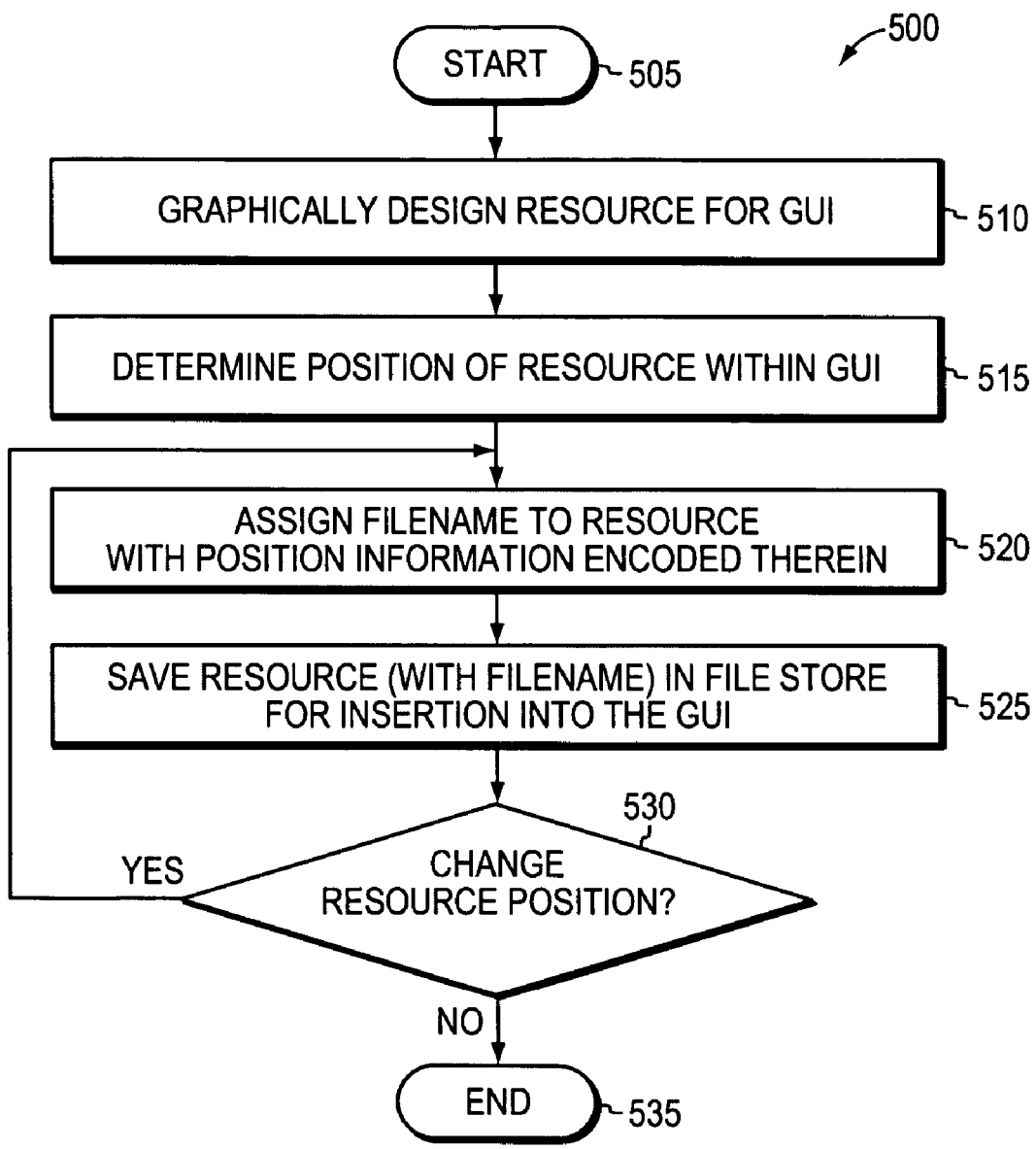
FIG. 5 is a flowchart illustrating a procedure for a graphic designer to create and place resources for a GUI in accordance with the present invention.
Figure 6:
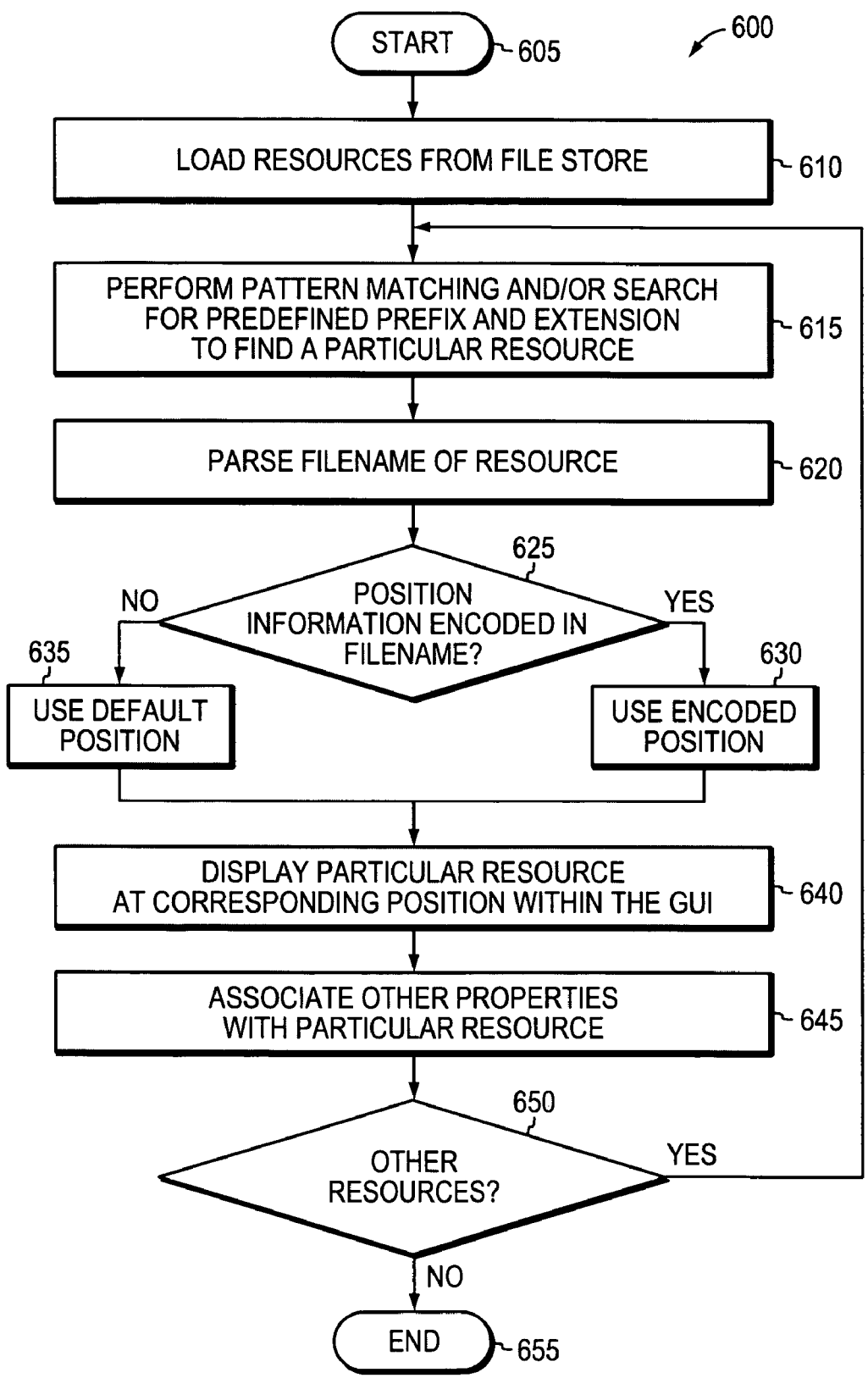
FIG. 6 is a flowchart illustrating a procedure for a GUI executable code to place resources as programmed by a software developer in accordance with the present invention.
Figure 7:
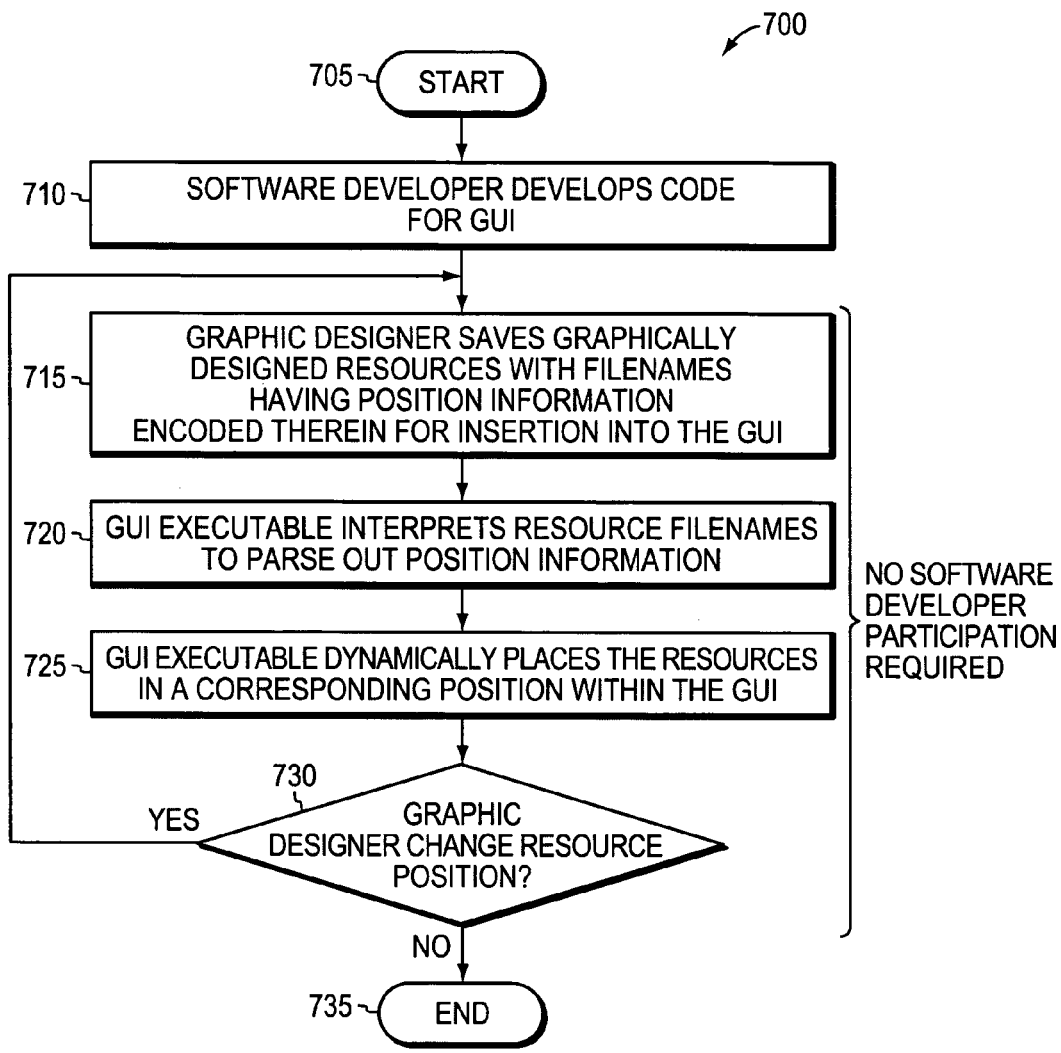
FIG. 7 is a flowchart illustrating a procedure for dynamically placing resources within a GUI in accordance with the present invention.

The following flowcharts shown in FIG. 5 through FIG. 7 demonstrate and summarize exemplary techniques that may be used by the graphic designers, software developers, and GUI executable in accordance with the present invention to obtain the advantageous results described herein.

FIG. 5 is a flowchart illustrating a procedure for a graphic designer to create and place resources for a GUI in accordance with the present invention. The procedure 500 starts at step 505, and continues to step 510, where the graphic designer graphically designs the resource, e.g., an image (help.jpg), for the GUI. At step 515, the designer determines the position of the resource within the GUI. Once the position is determined, the graphic designer assigns a filename to the resource with the position information encoded therein in step 520, as described above. For instance, if help.jpg were to be placed at coordinates 50X and 50Y, the assigned filename may be "help_50×50.jpg." At step 525, then, the graphic designer saves the resource in the file store (having the filename) for insertion into the GUI. Should the graphic designer decide to change the position of the resource in step 530, the designer simply changes the filename of the resource to correspond to the new position (e.g., "help_100×50.jpg") in step 520, and may provide the software developer with the new filename in step 520. Notably, as mentioned above, the graphic designer may have access to the GUI code, and may change the filename accordingly without intervention of the software developer. If the position of the resource does not change in step 530, the procedure ends at step 535.

FIG. 6 is a flowchart illustrating a procedure for a GUI executable code to place resources as programmed by a software developer in accordance with the present invention. The procedure 600 starts at step 605, and continues to step 610, where the GUI executable loads resources 248 from the file store 240. At step 615, a pattern matching may be performed to find a particular resource, such as, e.g., searching for a particular prefix and extension as described above (e.g., help*.jpg). Once the resource is located, the filename is parsed in step 620. If position information is contained within the filename at step 625 (e.g., "50×50"), the encoded position is returned (used) in step 630. If, on the other hand, there is no position information at step 625, then no position is returned, and the default position is used in step 635. At step 640, the GUI executable displays the particular resource at the corresponding location within the GUI (e.g., the encoded or default position). The GUI executable also associates other properties (e.g., controls) with the particular resource in step 645. If other resources remain at step 650, the procedure 600 returns to step 615 to perform a pattern match for the next particular resource. Otherwise, the procedure ends at step 655 with the created GUI.

Figure 1:
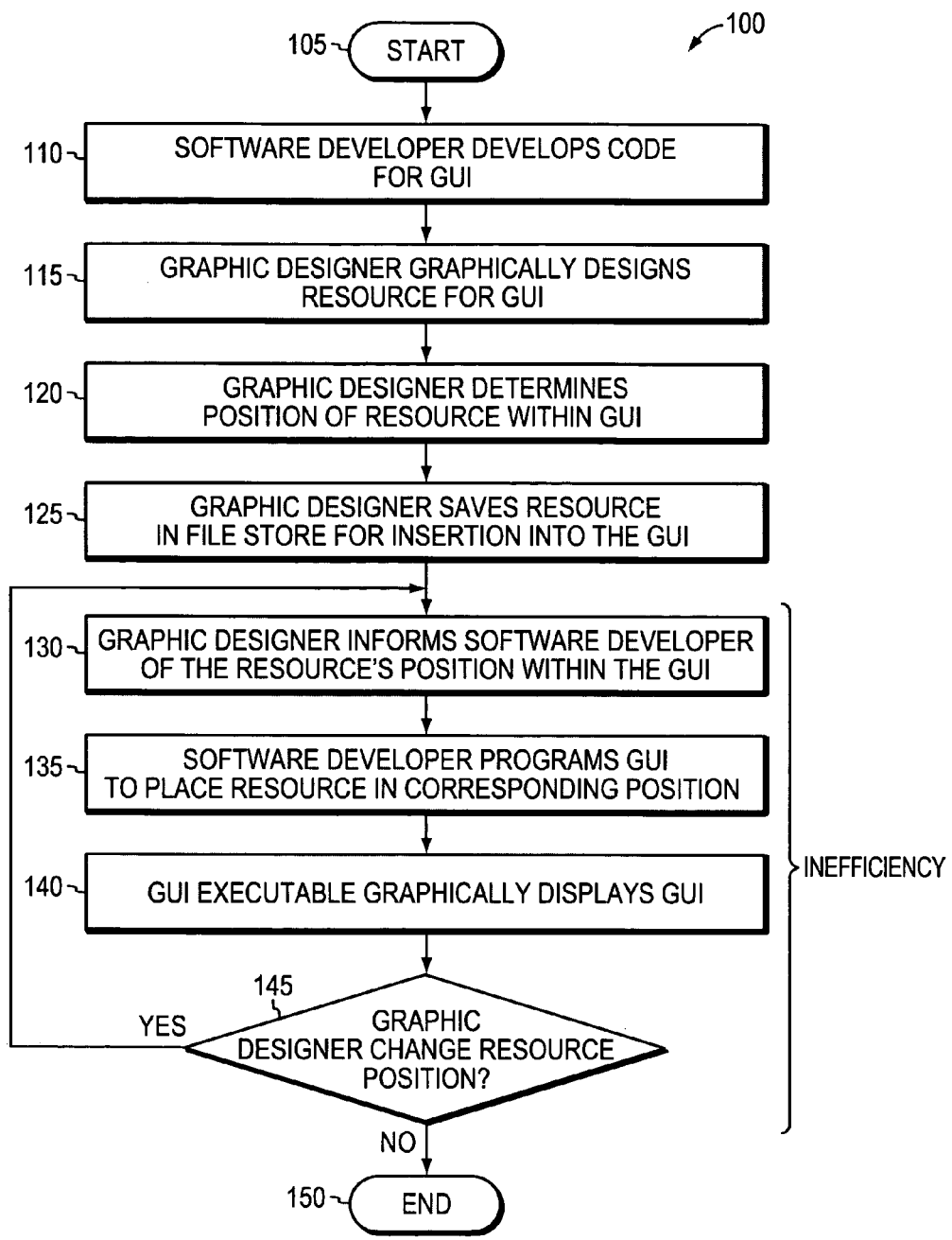
FIG. 1, previously described, is a flowchart illustrating an example of an inefficient procedure for developing a GUI.

In accordance with the present invention, then, both the graphic designer (FIG. 5) and the software developer (FIG. 6) may operate substantially independently of one another to create a GUI, thus alleviating the back-and-forth shown with reference to FIG. 1 above. Comparatively, FIG. 7 is a flowchart illustrating a procedure for dynamically placing resources within a GUI in accordance with the present invention. The procedure 700 starts at step 705, and continues to step 710, where a software developer develops code for the GUI, as described above (e.g., with reference to FIG. 6). At step 715, a graphic designer saves a graphically designed resource with a filename having position information encoded therein (e.g., in the file store) for insertion into the GUI in accordance with the present invention (e.g., "help_50×50.jpg"). As noted above in FIG. 5, should the graphic designer decide to change the position of the resource in step 720, the designer simply changes the filename of the resource to correspond to the new position and may provide the software developer with the new filename in step 715 (e.g., "help_100×50.jpg"). The GUI executable interprets the resource filenames in step 720 in order to parse out the position information (e.g., "100×50"), and in step 725, the GUI executable dynamically places the resources in corresponding positions (e.g., 100X and 50Y) within the GUI. If the graphic designer changes the position of a resource in step 730, the procedure returns to step 715 to save the new filename in accordance with the present invention described above. The GUI executable then interprets and places the resource (i.e., steps 720 and 725). Once there are no position changes to the resources in step 730, the procedure ends at step 735. Notably, in accordance with the present invention, the graphic designer's changing of the resource positions and subsequent replacement within the GUI (i.e., repeated steps 715 through 730) do not require participation from the software developer (i.e., step 710).

Advantageously, the novel technique dynamically places resources within a GUI. By encoding the position information within the filename of the resource, the novel technique reduces the steps involved between graphic designers and software developers for laying out the resources within the GUI. Accordingly, valuable preparation time in generating the GUI is saved for both the graphic designers and software developers. Allowing the graphical designers (or anyone) to dynamically change the position of a resource within the GUI simply by changing the resource's filename thus eliminates the graphical designers' dependency upon the software developers' re-coding the placement of the resources.

While there has been shown and described an illustrative embodiment that dynamically places resources within a GUI, it is to be understood that various other adaptations and modifications may be made within the spirit and scope of the present invention. For example, the invention has been shown and described herein for use with VB. However, the invention in its broader sense is not so limited, and may, in fact, be used with any other applicable programming language, such as, e.g., VB.NET, HTML (Hypertext Markup Language), Perl, C, C++, Java, etc., as will be understood by those skilled in the art. Also, while the invention has been shown using two-dimensional Cartesian coordinates, (e.g., X and Y), other coordinate systems may be used in accordance with the present invention, such as, e.g., polar coordinates (R and theta), three-dimensional coordinates (X, Y, and Z), etc., with only minor modifications to the filename format, as will also be understood by those skilled in the art. Further, the coordinates, while shown illustrative as pixels, may be other measurement units, e.g., inches, centimeters, etc. Moreover, while the above description refers to graphic designers and software developers, theses are merely representative, and any type of person or computer may utilize the present invention.

Notably, the term "filename" has been used herein to refer to a resource name having position information and extensions applied thereto. However, those skilled in the art will understand that resources with filenames may not be limited to storage within a file system. For instance, resources that are stored elsewhere, e.g., embedded within the executable or are stored within a database, may utilize the same convention as described in accordance with the present invention, i.e., a "filename" to represent the resource in a particular position within the GUI regardless of storage location of the resource.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the resource of the appended claims to cover all such variations and modifications as come within the true spirit and scope of the invention.

What is claimed is:

1. A method for dynamically placing resources within a graphical user interface (GUI), the method comprising:
   assigning a filename to a resource of the GUI, the filename having position information encoded therein, the position information relating to the location at which the resource is displayed on a graphical user interface (GUI);
   allowing a user to change the position of the resource by changing the position information encoded within the filename via editing x,y coordinates prior to the extension ; and
   generating the GUI by i) interpreting the filename to parse out the position information, and ii) placing displaying the resource in a position within the GUI according to the position information.

2. The method as in claim 1, further comprising:
   representing, with the position information, two-dimensional (2D) coordinates of the object within the GUI.

3. The method as in claim 2, wherein the 2D coordinates are of a particular point of the resource.

4. The method as in claim 3, further comprising:
   selecting the particular point of the resource from a group comprising: a geometric center of the resource, a top left corner of the resource, a top right corner of the resource, a bottom left corner of the resource, and a bottom right corner of the resource.

5. The method as in claim 2, wherein the 2D coordinates are one of either Cartesian coordinates or polar coordinates.

6. The method as in claim 1, further comprising:
   representing, with the position information, three-dimensional (3D) coordinates of the resource within the GUI, wherein the GUI is 3D.

7. The method as in claim 1, further comprising:
   representing, with the position information, a position of the resource within the GUI relative to another resource of the GUI.

8. The method as in claim 1, further comprising:
   representing, with the position information, a position of the resource within the GUI relative to a series of resources of the GUI.

9. The method as in claim 8, further comprising:
   representing, with the position information, the position of the resource within the series of resources in row and column form.

10. The method as in claim 8, further comprising:
    representing, with the position information, a spacing between the resources of the series.

11. The method as in claim 10, further comprising:
    adjusting the spacing between the resources of the series based on a screen size and resolution of the GUI.

12. The method as in claim 1, further comprising:
    placing the resource in a default position within the GUI in the event the position information is absent from the parsed filename.

13. The method as in claim 1, further comprising:
    formatting the filename of the resource as "{resourcename}_{position information}.{extension}," where "{resourcename}" is a unique predefined name of the resource, "{positioninformation}" is the encoded position information, and ".{extension}" is a file type extension of the resource.

14. The method as in claim 1, further comprising:
    coding the GUI using a programming language selected from a group comprising: Visual Basic (VB), VB.NET, Perl, Hypertext Markup Language (HTML), C, C++, and Java.

15. The method as in claim 1, further comprising:
    storing a plurality of resources in locations corresponding to a plurality of particular display resolutions; and
    retrieving one of the plurality of resources for use when generating the GUI based on a display resolution of the GUI.

16. An apparatus for dynamically placing resources within a graphical user interface (GUI), the apparatus comprising:
    a processor;
    a memory adapted to store resources;
    means for assigning a filename to a resource of the GUI, the filename having position information encoded therein, the position information relating to the location at which the resource is displayed on the GUI; means for allowing a user to change the position of the resource by changing the position information encoded within the filename via editing x,y coordinates prior to the extension; and
    means for generating the GUI by i) interpreting the filename to parse out the position information, and ii) displaying the resource within the GUI according to the position information.

17. A tangible computer readable storage medium storing executable program instructions, the program instructions dynamically placing resources within a graphical user interface (GUI), the executable program instructions comprising program instructions for:
    assigning a filename to a resource of the GUI, the filename having position information encoded therein, the position information relating to the location at which the resource is displayed on the GUI; allowing a user to change the position of the resource by changing the position information encoded within the filename via editing x,y coordinates prior to the extension; and generating the GUI by i) interpreting the filename to parse out the position information, and ii) placing displaying the resource in a position within the GUI according to the position information.

18. A computer for dynamically placing resources within a graphical user interface (GUI), the computer comprising:
 a display;
 an input device;
 a processor coupled to the display and input device, the processor adapted to execute software processes; and
a memory configured to store a GUI generation process executable by the processor, the GUI generation process configured to: i) interpret a filename to a resource of the GUI, the filename having position information encoded therein, the position information relating to the location at which the resource is displayed on the GUI, the filename interpreted to parse out the position information, ii) allow a user to change the position of the resource by changing the position information encoded within the filename via editing x,y coordinates prior to the extension, and ii) display the resource within the GUI according to the position information.

\* \* \* \* \*

UNITED STATES PATENT AND TRADEMARK OFFICE
CERTIFICATE OF CORRECTION

| | |
|---|---|
| PATENT NO. | : 7,627,832 B2 |
| APPLICATION NO. | : 11/359839 |
| DATED | : December 1, 2009 |
| INVENTOR(S) | : Sandor Ludmann |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this

Twenty-first Day of December, 2010

David J. Kappos
*Director of the United States Patent and Trademark Office*